No. 897,125. PATENTED AUG. 25, 1908.
E. J. McCABE, L. W. PARKER & J. MULVANEY.
APPARATUS FOR SEPARATING GAS AND OIL FROM FLUIDS.
APPLICATION FILED JULY 8, 1907.
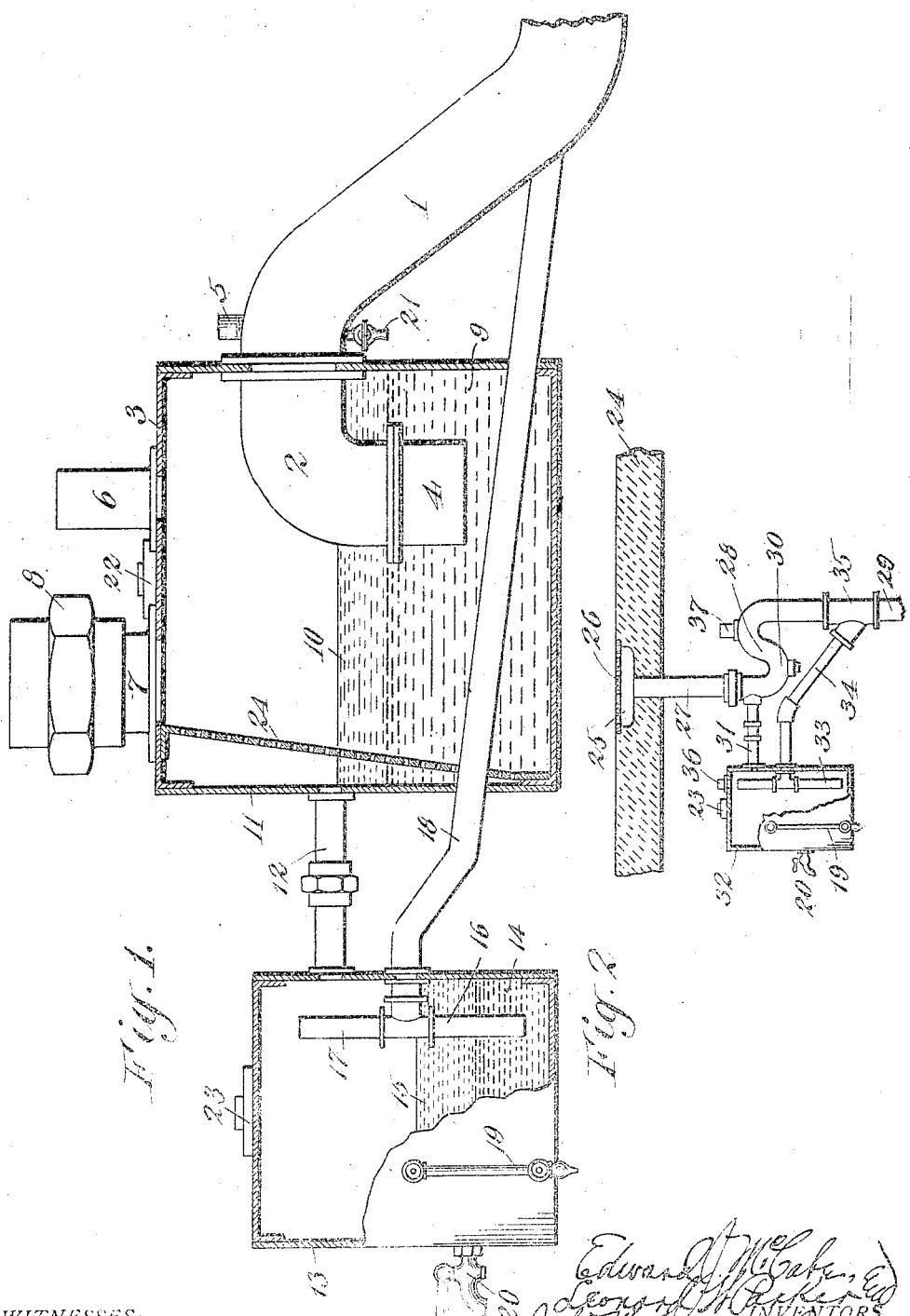
WITNESSES:

UNITED STATES PATENT OFFICE.

EDWARD J. McCABE, LEONARD W. PARKER, AND JOHN MULVANEY, OF NEW YORK, N. Y.

APPARATUS FOR SEPARATING GAS AND OIL FROM FLUIDS.

No. 897,125.   Specification of Letters Patent.   Patented Aug. 25, 1908.

Application filed July 8, 1907. Serial No. 382,572.

*To all whom it may concern:*

Be it known that we, EDWARD J. MCCABE, LEONARD W. PARKER, and JOHN MULVANEY, all citizens of the United States, and residing in New York, county of New York, and State of New York, have invented a new and useful Improvement in Apparatus for Separating Gas and Oil from Fluids, of which the following is a description.

This invention relates to apparatus for separating gas and oil from other fluids and has particular reference to an apparatus for separating gasolene from water.

Among the objects of my invention may be noted the following: to provide an apparatus by means of which gas and oils, when mixed with water, may be prevented from going into the sewer or sewer-mains of the city's system; to provide an apparatus by means of which gas and oils may be separated from liquids, and the oils subsequently recovered and stored; to provide an apparatus by means of which oil, when mixed with liquid, may be trapped and conveyed to storage to prevent waste; and to provide a simple, compact and effective apparatus which may be inserted in any sewer-main for the purpose of trapping gas and oil and passing to storage the oils which may combine with the liquids passing into the sewer.

With the above objects in view, and others which will be set forth during the course of this description, this invention consists in the parts, features, elements and combinations of elements hereinafter described and claimed.

In order that our invention may be thoroughly understood, we have provided a sheet of drawings illustrating modes in which the same may be applied for the purposes stated, and in said drawings: Figure 1 represents partially in elevation and partially in vertical section an apparatus which has been found effective, and which involves the principles of the invention; and Fig. 2 shows partially in elevation and partially in section another mode of use for the invention.

Referring to the drawings, the numeral 1 indicates the sewer-main or pipe forming part of any system which may be used in cities or towns for carrying off the sewage from dwellings or other structures; and said main is provided with the portion 2 extending into the tank or vessel 3 forming the main reservoir of our apparatus. The overhanging portion 2 of the main depends into the said vessel or tank 3 and terminates near the bottom of said vessel, as indicated at 4. The tank 3 may be of any suitable form, and may be made of any suitable material, and in any approved way, the principal objects being to make the said tank strong and air-tight in all its joints. In the overhanging portion 2 of the main, and outside the tank 3, a vent 5 is provided, the object of which is to prevent the liquid in the tank from siphoning through the main 1. The top of the tank is also provided with a vent 6, through which the gas, which will naturally accumulate near the top of the tank, may escape in order to prevent explosions, and undue pressure within the tank such as might result in forcing the liquid through the main, and permitting the gas to escape in that direction. The top of the tank is also provided with an inlet 7 provided with any suitable coupling 8 by means of which a waste-pipe, forming part of the drainage system of the building, may be connected to the inlet 7.

The liquid in the tank is indicated by 9 and the oil floating upon the top of the liquid is indicated by 10. One wall 11 of the tank 3 has an outlet-coupling 12, the bottom of the passage through which is substantially on a level with the bottom of the passage through the main 1, thus allowing the oil 10, which floats on the top of the liquid, to overflow through the coupling 12 into the storage-tank 13, as clearly shown in Fig. 1. The oil floating on the top of the liquid in the receiving-tank 3, and passing into the storage-tank 13, through the coupling 12, may be still slightly mixed with water, which naturally will descend to the bottom of the storage-tank, as indicated at 14, while the oil will still float as indicated at 15, and, in order to carry the water off, a pipe 16 has its lower end submerged and extending to near the bottom of the storage-tank, while its upper end terminates near the top of the storage-tank, and operates as a vent 17, which prevents the liquids in the storage-tank from being siphoned into the sewer by connection 18, which passes through the rear wall of the storage-tank, and which may be tapped into the sewer-main 1, as desired. In order to indicate the condition of the liquids in the storage-tank 13, and determine when the oil should be drawn therefrom, a gage-tube 19 of ordinary construction is connected with the storage-tank 13, and a spigot 20 is also applied to the storage tank for the purpose of drawing the oil therefrom. In order to determine the condition of the liquid passing from the receiving-tank 3 into the main 1, a tap-cock 21 is applied to the said main 1 just outside the receiving-tank 3; and in order to clean out the said receiving-tank, the same is provided with a manhole and cover 22, a manhole and cover 23 being applied to the storage-tank 13 for the same purpose. Oftentimes, the liquid running into the receiving tank from the drainage system of the building will have large particles which it is undesirable to have pass into the storage-tank, and to prevent said particles from passing into the storage-tank 13, a perforated screen or baffle 24 is rigidly set inside the receiving-tank 3 in front of the outlet into the coupling 12, said baffle extending from top to bottom of the receiving-tank 3, and preferably at an inclination, so that its bottom will be close to the bottom of the front wall, and its top will be substantially at the front of the inlet 7 to the tank.

Primarily, it should be understood that it often happens that gasolene leaks from automobiles on to the floor of the garage, and very often is carelessly or accidentlly spilled, and that, in either case, it is washed into the sewer or drainage pipes of the building in an effort to get rid of it. In passing into the drainage system and into the sewer, it has been found that the oil and gas accumulate to such an extent as to produce destructive explosions, and it is to prevent these explosions that our apparatus is inserted either in the sewer-main connected with the drainage system of the building, or in the drainage system itself, and the liquid, mixed of oil, gas and water, will pass into the tank 3 through the inlet 7, and will accumulate in the bottom of the tank and the water only pass into the sewer-main 1 through the outlet and connections 4. In the tank, the gas will naturally rise to the top or to the space between the top of the liquid and the top of the tank, while the oil will naturally float on top of the water or other liquid. Since the outlet through the main 1 is substantially on the level of the overflow through the coupling 12, and since the end 4 of the main extends to near the bottom of the inlet-tank 3, the water will naturally pass up through the main, while the oil will overflow through the coupling 12 into the storage-tank 13. Of course, the gas will escape through the vent 6, which may be extended to the outside of the building by any suitable pipe system. Overflowing into the tank 13, the liquid will become comparatively quiet, and the water will go to the bottom, while the oil will float. The gage will indicate the height of the liquid in the storage-tank 13, and the oil may be drawn off at any time through the spigot 20, while the water will pass through the outlet-pipe 16 into the sewer-connection 18. Any gas which may accumulate in the tank 13 may be passed off through a vent similar to the vent 6 in the receiving-tank, or will pass through the top of the coupling 12 into the tank 3 and thence to the outlet or vent 6.

In the form of our invention shown in Fig. 2, the numeral 24 indicates the floor of a garage, and 25 the sink usually formed therein to carry off the drainage or wash from the vehicles in storage. Covering the sink is the usual drain or screen 26, and connected with the sink is the sewer-pipe 27 which runs to the usual S-trap 28, connected directly with the sewer-main by the pipe 29. Above the bottom of the trap-portion 30, an overflow coupling 31 is provided, which extends to a storage-tank 32, which is in all material respects substantially the same as the storage-tank 13 shown in the other form of our invention, said storage-tank being provided with the spigot 20, gage-tube 19 and manhole 23, all these parts being similar to those illustrated in Fig. 1. The storage-tank is provided with the combined drainage and vent-pipe 33, the lower portion of which carries off the liquid which accumulates in the bottom thereof, and the upper portion of which acts as a vent the same as 17, said pipe 33 being connected by the pipe 34 to the coupling 35, which is connected to the sewer-main connection 29. The storage-tank 32 is also provided with a vent 36 which may be connected to any ventilating pipe and conducted to the outside of the building, and an additional vent 37 is placed in the sewer-connection at the top of the S-trap which may also be conducted to the outside of the building. The mode of operation of this form of our invention is substantially the same as that above described in connection with the other form; but, in this second form of our invention, a special form of receiving-tank is unnecessary, since the S-trap takes its place and becomes the equivalent thereof and, in consequence, the special screen or baffle 24 is eliminated, since the drain 26 performs the same function.

Having thus described our invention, what we claim and desire to secure by Letters Patent is:

1. The separating apparatus, having in combination a receiving-tank, a storage-tank coupled thereto, a baffle within the receiving-tank to prevent the passage of particles to the storage-tank, an inlet to the receiving-tank, a gas-vent in the latter, an outlet for the liquid in the receiving-tank terminating near the bottom of the latter, and provided with a vent, and an outlet for the storage-tank coupled to the outlet for the receiving-tank.

2. The separating apparatus, having in combination a receiving-tank, a storage-tank, an overflow coupling between the two, an outlet from the receiving-tank, terminating near the bottom of the latter, and having the bottom of its outlet-passage substantially on the level with the bottom of the overflow coupling, an outlet in the storage-tank coupled with the outlet of the receiving-tank, and a vent in said outlet to prevent the liquid in the tank from being siphoned therefrom.

3. The separating apparatus, having in combination a receptacle, means for connecting the same with a drainage system; a storage-tank; an overflow coupling from said receptacle to the storage-tank; means for connecting the said receptacle and tank with a sewer-system; and means for preventing particles from passing into the storage tank, substantially as described.

4. The separating apparatus, having in combination a receptacle; means for connecting the same with a drainage system; a storage-tank; an overflow coupling from said receptacle to the storage-tank; means for connecting the said receptacle and tank with a sewer system; and means for ventilating both the receptacle and the tank.

5. In an apparatus for separating fluids of different specific gravity, the combination of a main receptacle for all the fluids; means for connecting said receptacle with a drainage system; an auxiliary receptacle; a connection between the two receptacles for passing fluid from one to the other; and a normally open passage for connecting both receptacles with a sewer system, whereby the fluid of greater specific gravity only is automatically passed thereby to the sewer.

6. In an apparatus for separating fluids of different specific gravity, the combination of a main and an auxiliary receptacle; means connecting the main receptacle with a drainage system; a connection between the two receptacles for passing fluid from one to the other; and a normally open passage for connecting the auxiliary receptacle with a sewer system, whereby the fluid of greater specific gravity only will automatically pass into the sewer.

In testimony whereof we have hereunto signed our names in the presence of two subscribing witnesses.

EDWARD J. McCABE.
LEONARD W. PARKER.
JOHN MULVANEY.

Witnesses:
 JOHN KEIM, Jr.,
 JOSEPHINE FIELD.